United States Patent [19]

Parsons et al.

[11] Patent Number: 5,105,665
[45] Date of Patent: Apr. 21, 1992

[54] SENSORS

[75] Inventors: Philip Parsons, Farnham; Jolyon P. Willson, Andover; Eric Metcalf, Alresford, all of England

[73] Assignee: Schlumberger Industries Limited, Farnborough, England

[21] Appl. No.: 567,024

[22] Filed: Aug. 14, 1990

[30] Foreign Application Priority Data

Aug. 30, 1989 [GB] United Kingdom ............... 8919573
May 11, 1990 [GB] United Kingdom ............... 9010660

[51] Int. Cl.$^5$ .................. G01L 7/08; G01L 9/08; G01L 11/00
[52] U.S. Cl. ...................... 73/704; 73/705; 73/754; 73/DIG. 1
[58] Field of Search ............... 73/702, 754, 704, 705, 73/727, 721, DIG. 4, 754, 579, 584, 592, 862.59, 32 A, 517 AV, DIG. 1; 250/231.19

[56] References Cited

U.S. PATENT DOCUMENTS

| | | | |
|---|---|---|---|
| 4,229,979 | 10/1980 | Greenwood | 73/704 |
| 4,764,244 | 8/1988 | Chitty | 73/704 |
| 4,945,773 | 8/1990 | Sickafus | 73/862.59 |
| 4,972,076 | 11/1990 | Willson | 73/862.59 |

FOREIGN PATENT DOCUMENTS

| | | |
|---|---|---|
| 0127929 | 5/1989 | Japan ...................... 73/702 |
| 2185106 | 7/1987 | United Kingdom . |
| 2208931 | 4/1989 | United Kingdom . |
| 2218809 | 11/1989 | United Kingdom . |
| 2229816 | 10/1990 | United Kingdom . |

Primary Examiner—Donald O. Woodiel
Attorney, Agent, or Firm—Sanford J. Asman

[57] ABSTRACT

In a micromachined silicon pressure sensor comprising a resonantly vibratable beam supported on a diaphragm, the beam is indirectly excited into resonant vibration by directing an optical excitation signal at the beam resonant frequency onto a part of the sensor other than the beam, preferably the diaphragm. Preferably, the optical excitation signal is of a wavelength to which the sensor is fairly transparent, and is directed through the beam and diaphragm to be absorbed by a suitable coating on the underside of the diaphragm. The optical excitation signal produces local heating, and the resulting expansions and contractions at the beam resonant frequency propagate through the sensor structure to excite the beam into resonant vibration. Another optical signal is used to detect the frequency of vibration of the beam, and a positive feedback loop maintains the frequency of the excitation signal equal to the detected beam vibration frequency. In a modification, the indirect excitation is achieved by forming resistors or piezoelectric devices in a part of the sensor other than the beam, so that the expansions and contractions mentioned above can be excited electrically rather than optically.

15 Claims, 2 Drawing Sheets

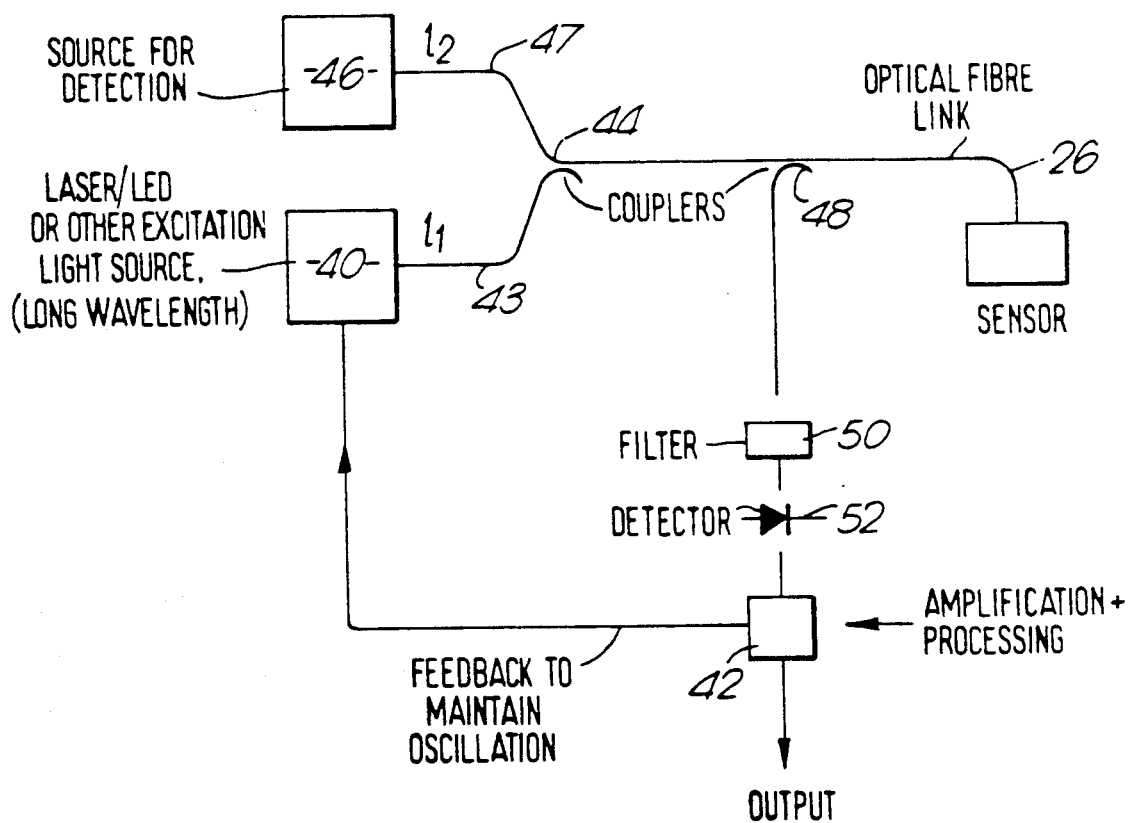

SENSORS

This invention relates to sensors, and is more particularly but not exclusively concerned with sensors in which the parameter to be sensed affects the frequency of a resonantly vibrating element whose resonant vibration is excited and/or sensed optically.

It has already been proposed, in a letter entitled "Optically Activated Vibrations in a Micromachined Silica Structure" by S. Venkatesh and B. Culshaw (Electronics Letters, 11 Apr. 1985, Vol. 21, No. 8), to provide a sensor comprising a microminiature bridge of silicon dioxide, fabricated using anisotropic etch techniques on a silicon substrate. A thin gold film is sputtered onto the bridge, which is then excited into resonant vibration, typically at about 260 KHz, by directing a suitably modulated laser beam onto the centre of the bridge. The frequency of vibration of the bridge is detected using another laser beam. The sensor is arranged such that the parameter to be sensed acts on the substrate so as to vary the resonant frequency of the bridge.

The sensor of this prior proposal suffers from the disadvantage that the characteristics of the sensing element are not very stable or repeatable, firstly because the silicon dioxide material of the sensing element is amorphous and secondly because of the difficulty of producing a uniform and repeatable gold coating on such an amorphous sensing element. In particular, metal coating can result in a very large and rather unpredictable temperature coefficient.

It is therefore an object of the present invention to provide a sensor in which the abovementioned disadvantage is significantly alleviated.

According to the present invention, there is provided a sensor comprising a resonantly vibratable element formed as part of a unitary semiconductor structure which is arranged such that a measurand applied to the structure affects the resonant frequency of the vibratable element, and means for applying an excitation signal to the sensor to excite resonant vibration of said element, wherein said excitation signal applying means is arranged to excite said element indirectly by applying said excitation signal to a region of the structure other than said element.

The excitation signal applying means may comprise means for applying an electrical signal to a resistor or piezoelectric device formed in said region, whereby to produce vibration-inducing stresses in said region by local heating or piezoelectric effect respectively.

Alternatively and preferably, the excitation signal applying means may comprise means for applying an optical excitation signal to said region. In this case said region is preferably provided with a coating for absorbing said optical excitation signal, for example a coating of a metal such as aluminium, chromium or gold, or a coating of a material exhibiting surface piezoelectric effect, such as zinc oxide. Said semiconductor structure may conveniently be made from silicon, preferably single crystal silicon.

In a preferred embodiment of the invention, the semiconductor structure includes a diaphragm, and said element comprises a beam arranged to have the tension therein varied by flexing of the diaphragm in response to changes in pressure applied to the diaphragm, whereby the sensor serves as a pressure sensor. In that case, said region of the structure may be on one surface of the diaphragm, or adjacent one end of the beam.

The invention will now be described, by way of example only, with reference to the accompanying drawings, of which:

FIG. 3 is a schematic diagram of a complete sensor system based upon the sensor of FIG. 1.

Figure 1:
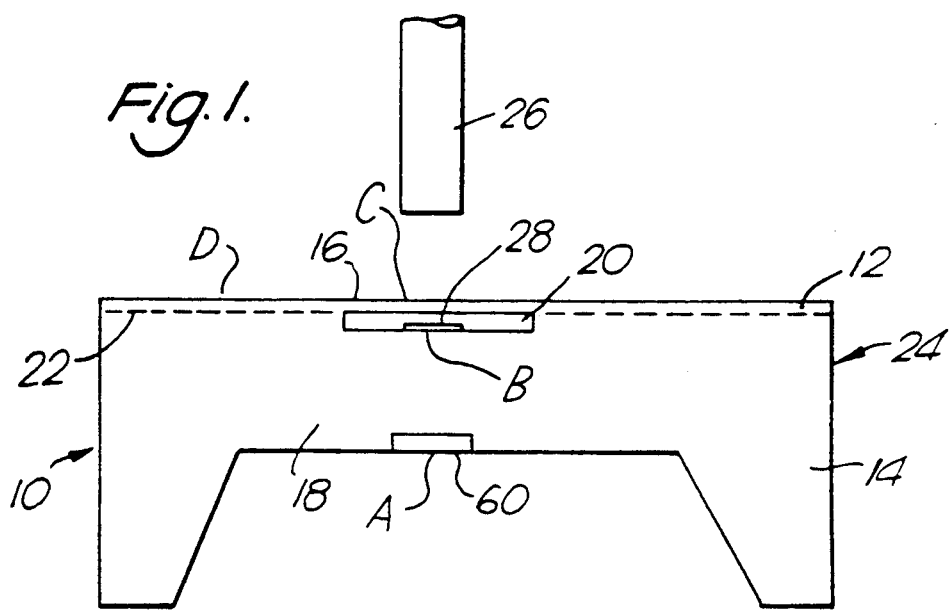
FIG. 1 shows somewhat schematically an optically excitable silicon pressure sensor in accordance with the present invention.

The sensor of FIG. 1 is indicated generally at 10, and is basically similar to the sensor described in detail in United States patent application Ser. No. 07/358,771, filed May 30, 1989, by Phillip W. Barth, et. al., entitled LAMINATED SEMICONDUCTOR SENSOR WITH VIBRATING ELEMENT AND ASSOCIATED METHOD AND PRODUCT, the disclosure of which is hereby incorporated by reference. Thus the sensor 10 comprises first and second single crystal silicon wafers 12, 14, of which the first wafer has a beam 16 formed therein by cutting two parallel slots therethrough to define the two longitudinally-extending sides of the beam, while the second has a diaphragm 18 with a trench 20 in its upper surface formed therein by electrochemical etching. The two wafers 12, 14 are fusion bonded together at the dotted line 22, to form a unitary structure 24 in which the beam 16 is disposed above the trench 20 in the diaphragm 18, as described in the aforementioned United States patent application.

To use the sensor 10 as a pressure sensor, the unitary silicon structure 24 is sealed in a suitable housing (not shown), with the upper surface of the diaphragm 18 facing into an evacuated chamber within the housing. The beam 16 is excited into resonant vibration, and a pressure to be sensed is admitted to the housing beneath the diaphragm 18, so that the diaphragm flexes in dependence on the pressure, and thus varies the tension in, and therefore the resonant frequency of, the beam.

In the aforementioned United States patent application, the principal methods described for exciting the beam 16 into resonant vibration and sensing the frequency of the resulting vibrations are electrostatic and piezoelectric respectively, although direct optical excitation, by applying pulses of light energy directly to the beam, is also disclosed. In accordance with prior art teachings, e.g., of the aforementioned letter by Venkatesh and Culshaw, this would typically have involved providing the beam 16 with a metal coating, e.g., of gold, at the location indicated at C in FIG. 1, with the disadvantage mentioned earlier. However, we have found that it is possible to excite the beam 16 into resonant vibration indirectly, by directing the optical excitation signal at a region of the unitary structure 24 other than the beam.

Thus we have found that resonant vibration of the beam 16 can be optically excited by directing a suitable pulsed optical excitation signal, via an optical fibre 26 which passes sealingly through the aforementioned evacuated chamber and terminates immediately above the beam, onto an optically absorptive coating 28 of a suitable metal, e.g., aluminium, chromium or gold, deposited, typically by sputtering, on the upper surface of the diaphragm 18 in the base of the trench 20, at the position indicated at B in FIG. 1. It will be noted that the optical excitation signal passes through the beam 16, which can readily be achieved by using a signal whose wavelength is of the order of 1300 nm, to which the unitary silicon structure 24 is substantially transparent.

Since the beam 16 does not require to be coated and therefore consists solely of single crystal silicon, it has a very high Q and its vibration characteristics are very stable and repeatable: in particular, its temperature coefficient is much lower than that of a coated beam, and much more predictable and stable.

With the coating 28 is deposited at B, it forms with the underside of the beam 16 a Fabry-Perot optical cavity, which can be used if desired to sense the frequency of vibration of the beam.

As an alternative, the coating 28 can be deposited at the position indicated at D in FIG. 1, adjacent one end of the beam 16 (which would clearly necessitate relocating the optical fibre 26), or at the position indicated at A in FIG. 1, on the underside of the diaphragm 18. Also, instead of an optically absorptive metal coating, a coating of a material exhibiting surface piezoelectric effect, eg zinc oxide, can be used.

Figure 2:
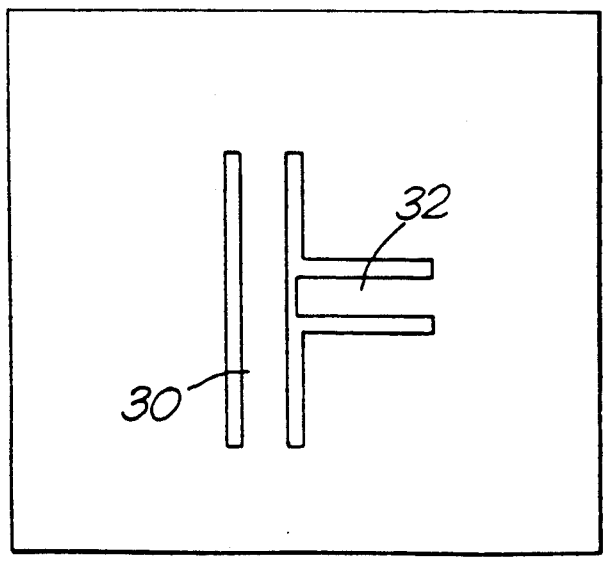
FIG. 2 is a plan view of a modified version of the sensor of FIG. 1.

We have also found that by exciting the diaphragm 18, it is possible to indirectly excite two resonant elements, eg beams, simultaneously. FIG. 2 is a plan view of such an arrangement, with a first beam 30 substantially identical to the beam 16 of FIG. 1 (i.e., arranged to be tensioned by an associated diaphragm not shown in FIG. 2), and a second, cantilever beam 32, disposed at right angles to the first beam. The beam 32 is formed in the same cutting operation as is used to form the beam 30, and is used for temperature compensation purposes as described in more detail in U.S. Pat. No. 4,972,076.

The way in which the sensor 10 is incorporated into a sensor system for sensing pressure is illustrated in FIG. 3. Thus an excitation light source 40, typically a laser diode or an LED which produces an optical output at a first wavelength $l_1$ of about 1300 nm, is driven by an amplifier 42 to produce a pulsed optical excitation signal at a frequency approximately equal to the expected resonant frequency of the beam 16 in the sensor 10. The output of the source 40 is coupled via an optical fibre 43 and one input port of an optical coupler 44 into the optical fibre 26, along with a continuous optical signal, of lower wavelength $l_2$, which is produced by a source 46, typically an LED, and applied via an optical fibre 47, to another input port of the coupler 44.

The pulsed optical output signal of wavelength $l_1$ exits the end of the optical fibre 26, and is incident upon and absorbed by the coating 28, thus creating localised thermal stress which excites the diaphragm 18 into vibration and thereby indirectly exciting the beam 16 into resonant vibration.

The optical signal of wavelength $l_2$ is modulated by the resonantly vibrating beam 16 in the sensor 10, and reflected back along the optical fibre 26 to a splitter 48, and thence through a Fabry-Perot or like filter 50 to a photoelectric detector 52. The output of the detector 52, which contains a component at the resonant frequency of the beam 16, is applied to the input of the amplifier 42 to create a positive feedback loop, which adjusts the operating frequency of the source 40 so as to maintain the beam vibrating at its resonant frequency, while a secondary output from the amplifier 42, again containing a component at the resonant frequency of the beam 16, constitutes the pressure dependent output of the system.

Several modifications can be made to the described embodiments of the invention.

For example, suitable optically absorbent coatings other than metal or a piezoelectric material can be used to absorb the optical excitation signal: indeed, in the limit, the coating may be omitted altogether, particularly if an especially sensitive part of the structure 24 (other than the beam 16) is located and/or slightly more optical power is used.

Also, the beam 16 can be indirectly excited into resonant vibration by excitation signals other than an optical excitation signal. Thus the optical excitation signal is believed to work by creating vibration-inducing stresses resulting from local heating due to absorption of the light constituting the optical signal (which stresses are enhanced or supplanted by stresses due to piezoelectric effect when the absorptive coating 28 exhibits surface piezoelectric effect). Similar local heating and/or piezoelectric effects can be created by forming a resistor or piezoelectric resistor in the wafer 12 or the wafer 14 at a location corresponding to a respective one of the locations A, B, D specified for the coating 28. This resistor indicated at 60 and shown by way of example in location A in FIG. 1 can be formed as described in the aforementioned United States patent application, and would enable resonant vibration of the beam 16 to be excited by an electrical excitation signal, e.g., from the primary (or feedback) output of the amplifier 42 of FIG. 3, rather than an optical one. The vibrations can still be sensed optically, if desired: however, they can alternatively be sensed electrically, for example by means of piezoresistors, as described in the aforementioned United States patent application.

We claim:

1. A sensor system for sensing measurand, the system comprising:
   a sensor comprising a unitary semiconductor structure having a resonantly vibratable element formed as part thereof, such that application of the measurand to the structure affects the resonant frequency of the vibratable element; and
   means for applying an optical excitation signal to the sensor to excite resonant vibration of said element;
   wherein said excitation signal applying means is arranged to apply said optical excitation signal to a region of the structure other than said element, whereby to create in said region vibration-inducing stresses which propagate through said structure to said element to excite said element into resonant vibration.

2. A sensor system as claimed in claim 1, wherein said region is provided with a coating for absorbing said optical excitation signal.

3. A sensor system as claimed in claim 2, wherein said coating is of a metal selected from aluminum, chromium and gold.

4. A sensor system as claimed in claim 2, wherein said coating is of a material exhibiting surface piezoelectric effect.

5. A sensor system as claimed in claim 4, wherein said material is zinc oxide.

6. A sensor system as claimed in claim 1, wherein said semiconductor structure is made from single crystal silicon.

7. A sensor system as claimed in claim 1, wherein the semiconductor structure includes a diaphragm, and said element comprises a beam arranged to have the tension therein varied by flexing of the diaphragm in response to changes in pressure applied to the diaphragm, whereby the sensor serves as a pressure sensor.

8. A sensor system as claimed in claim 7, wherein said region of the structure is on one surface of the diaphragm.

9. A sensor system as claimed in claim 7, wherein said region of the structure is adjacent one end of the beam.

10. A sensor system for sensing a measurand, the system comprising:

a sensor comprising a unitary semiconductor structure having a resonantly vibratable element formed as part thereof, such that application of the measurand to the structure affects the resonant frequency of the vibratable element; and means for applying an electrical excitation signal to the sensor to excite resonant vibration of said element;

wherein said sensor includes a resistor formed in a region of the structure other than said element, and said excitation signal applying means is arranged to supply said electrical excitation signal to said resistor, whereby to create in said region vibration-inducing stresses which propagate through said structure to said element to excite said element into resonant vibration.

11. A sensor system as claimed in claim 10, wherein said resistor is a piezoelectric resistor.

12. A sensor system as claimed in claim 10, wherein said semiconductor structure is made from single crystal silicon.

13. A sensor system as claimed in claim 10, wherein the semiconductor structure includes a diaphragm, and said element comprises a beam arranged to have the tension therein varied by flexing of the diaphragm in response to changes in pressure applied to the diaphragm, whereby the sensor serves as a pressure sensor.

14. A sensor system as claimed in claim 13, wherein said region of the structure is on one surface of the diaphragm.

15. A sensor system as claimed in claim 13, wherein said region of the structure is adjacent one end of the beam.

* * * * *